(12) United States Patent
Shidler et al.

(10) Patent No.: US 7,333,950 B2
(45) Date of Patent: Feb. 19, 2008

(54) SYSTEM FOR CREATING, PRICING AND MANAGING AND ELECTRONIC TRADING AND DISTRIBUTION OF CREDIT RISK TRANSFER PRODUCTS

(76) Inventors: Jay H. Shidler, 810 Richards St., Ste 1000, Honolulu, HI (US) 96813; Robert L. Denton, The Shidler Group 9 W. 57th St., Suite 1670, New York, NY (US) 10019; Thomas W. Jasper, Primus Corporate Services, Inc. 375 Park Ave., Suite 1302, New York, NY (US) 10152; J. Gregg Whittaker, 1844 Kingbird La., Liberty, MO (US) 64068; Alexander C. Rainsby, Primus Corporate Services, Inc. 375 Park Ave., Suite 1302, New York, NY (US) 10152; Walter E. Hebblethwaite, The Shidler Group 810 Richards St., Ste 1000, Honolulu, HI (US) 96813; Alan Margol, The Shidler Group 810 Richards St., Ste 1000, Honolulu, HI (US) 96813; Joseph P. Bauman, Primus Corporate Services, Inc. 375 Park Ave., Suite 1302, New York, NY (US) 10152; Aaron A. Eberhardt, The Shidler Group 810 Richards St., Ste 1000, Honolulu, HI (US) 96813

( * ) Notice: Subject to any disclaimer, the term of this patent is extended or adjusted under 35 U.S.C. 154(b) by 1140 days.

(21) Appl. No.: 09/894,851

(22) Filed: Jun. 27, 2001

(65) Prior Publication Data
US 2002/0055897 A1    May 9, 2002

Related U.S. Application Data

(60) Provisional application No. 60/215,199, filed on Jun. 29, 2000, provisional application No. 60/215,205, filed on Jun. 29, 2000, provisional application No. 60/215,200, filed on Jun. 29, 2000, provisional application No. 60/215,201, filed on Jun. 29, 2000, provisional application No. 60/215,202, filed on Jun. 29, 2000, provisional application No. 60/215,198, filed on Jun. 29, 2000, provisional application No. 60/215,203, filed on Jun. 29, 2000, provisional application No. 60/215,196, filed on Jun. 29, 2000, provisional application No. 60/215,197, filed on Jun. 29, 2000, provisional application No. 60/215,195, filed on Jun. 29, 2000, provisional application No. 60/215,194, filed on Jun. 29, 2000, provisional application No. 60/215,193, filed on Jun. 29, 2000, provisional application No. 60/215,192, filed on Jun. 29, 2000, provisional application No. 60/215,191, filed on Jun. 29, 2000, provisional application No. 60/215,190, filed on Jun. 29, 2000, provisional application No. 60/215,189, filed on Jun. 29, 2000, provisional application No. 60/215,186, filed on Jun. 29, 2000, provisional application No. 60/215,188, filed on Jun. 29, 2000, provisional application No. 60/215,187, filed on Jun. 29, 2000, provisional application No. 60/215,185, filed on Jun. 29, 2000, provisional application No. 60/215,184, filed on Jun. 29, 2000, provisional application No. 60/215,204, filed on Jun. 29, 2000.

(51) Int. Cl.
*G06Q 40/00* (2006.01)
(52) U.S. Cl. .......................................................... 705/35
(58) Field of Classification Search .................... 705/35
See application file for complete search history.

(56) References Cited

U.S. PATENT DOCUMENTS 5,704,045 A * 12/1997 King et al. .................... 705/35

OTHER PUBLICATIONS

Creditex Launches Emerging Markets Platform, Completes First Trade. PR Newswire, New York. Jun. 12, 2000. (2 pages).*

* cited by examiner

*Primary Examiner*—Kambiz Abdi
*Assistant Examiner*—Jennifer Liversedge

(74) *Attorney, Agent, or Firm*—Morgan, Lewis & Bockius LLP

(57) ABSTRACT

A computerized system creates and prices synthetic credit products on demand and distributes them to customers electronically through financial information systems and online trading websites. The system includes: (a) a Capacity Creation module for assessing the capacity of a defined financial market to absorb defined credit products at a minimum level of default risk; (b) a Product Creation module for creating synthetic credit products on demand, including a Product Creation engine for creating credit products matched to qualified reference entities based upon internal templates in accordance with the determined portfolio capacity; and (c) a Pricing Creation module which tracks financial, pricing, and interest rate data available from external sources, and determines the pricing of the credit products consistent with the determined portfolio capacity. The credit products may cover a wide range of conventionally known financial instruments, such as credit swaps, letters of credit, and credit insurance, which allow customers to trade and transfer the risks of various types of credit obligations (bond, loan, or receivable), as well as new types of credit risk transfer and enhancement products enabled by the invention system. Credit product sellers use these credit risk transfer, insurance, or enhancement products to isolate, modify, or unbundled credit risks from other risks found in obligations owed to them by third parties. These risks are transferred to credit risk buyers for a price that is based on the level of risk assumed. Credit products, particularly credit swaps, can also be used to construct a new generation of innovative structured products, such as credit-linked notes, synthetic CDOs, and principal-protected notes.

25 Claims, 2 Drawing Sheets

Proprietary Click & Hedge™ Technology

SYSTEM FOR CREATING, PRICING AND MANAGING AND ELECTRONIC TRADING AND DISTRIBUTION OF CREDIT RISK TRANSFER PRODUCTS

This U.S. patent application claims the priority filing date of the following provisional patent applications filed on Jun. 29, 2000:

1. SYSTEM FOR THE CREATION, DISTRIBUTION, EXECUTION, AND MANAGEMENT AND CONTROL OF CREDIT RISK TRANSFER PRODUCTS ONLINE OVER THE INTERNET AND VARIOUS INTERNET SYSTEMS, filed as Provisional Appl. 60/215,199, in the names of J. Shidler, R. Denton, T. Jasper, J. Whittker, A. Rainsby, W. Hebblethwaite, A. Margol, J. Bauman.

2. MOTHOD AND SYSTEM FOR DETERMINING THE CREDITWORTHINESS AND CAPITAL ADEQUACY OF ENTITIES THAT SELL CREDIT RISK TRANSFER PRODUCTS BASED ON SIMULATION OF THE EXPECTED LOSS OF INDIVIDUAL CREDIT RISK TRANFER PRODUCTS, filed as Provisional Appl. 60/215,205, in the names of J. Shildler, R. Denton, W. Hebblethwaite.

3. MOTHOD AND SYSTEM FOR DETERMINING THE CREDITWORTHINESS AND CAPITAL ADEQUACY OF ENTITIES THAT SELL CREDIT RISK TRANSFER PRODUCTS BASED ON SIMULATION OF THE EXPECTED LOSS OF A PORTFOLIO OF CREDIT RISK TRANSFER PRODUCTS, filed as Provisional Appl. 60/215,200, in the names of J. Shildler, R. Denton, W. Hebblethwaite.

4. MOTHOD AND SYSTEM FOR DETERMINING THE CREDITWORTHINESS AND CAPITAL ADEQUACY OF ENTITIES THAT SELL CREDIT RISK TRANSFER PRODUCTS BASED ON A STATIC EXPECTED LOSS CASH FLOW MODEL FOR A PORTFOLIO OF CRREDIT RISK TRANSFER PRODUCTS, filed as Provisional Appl. 60/215,201, in the names of J. Shildler, R. Denton, W. Hebblethwaite.

5. METHOD AND SYSTEM FOR DETERMINING THE EXPECTED LOSS ON A SENIOR TRANCHE OF THE CAPITAL OF AN ENTITY THAT SELLS CREDIT RISK TRANSFER PRODUCTS BASED ON A DYNAMIC CASH FLOW SIMULATION MODEL FOR A PORTFOLIO OF CREDIT RISK TRANSFER PRODUCTS, filed as Provisional Appl. 60/215,202, in the names of J. Shildler, R. Denton, T. Denton, W. Hebblethwaite, A. Margol.

6. SYSTEM AND METHOD FOR USING REFERENCE ENTITY FILTERING LOGIC AND DATABASE MATCHING LOGIC TO CREATE A PORTFOLIO OF INVESTMENT GRADE CREDIT RISK TRANSFER PRODUCTS, filed as Provisional Appl. 60/215,198, in the names of J. Shildler, R. Denton, T. Jasper, W. Hebblethwaite, A. Rainsby.

7. SYSTEM AND METHOD FOR CALCULATING CAPACITY AND UPDATING AVAILABILITY BY REFERENCE ENTITY FOLLOWING TRANSACTIONS THROUGH FEEDBACK APPLICATION OF PORTFOLIO CONSTRAINTS ADJUSTMENT, filed as Provisional Appl. 60/215,203, in the names J. Shildler, R. Denton, T. Jasper, A. Rainsby.

8. METHOD AND SYSTEM FOR USING CREDIT DEFAULT SWAPS TO CREDIT ENHANCE COMMERCIAL BANK LETTERS OF CREDIT, filed as Provisional Appl. 60/215,196, in the names of J. Shildler, R. Denton, T. Jasper.

9. METHOD AND SYSTEM FOR USING CREDIT DEFAULT SWAPS TO CREDIT ENHANCE FINANCIAL GUARANTY INSURANCE POLICIES, filed as U.S. Provisional Appln. 60/215,197, in the names of J. Shildler, R. Denton, T. Jasper.

10. METHOD AND SYSTEM USED TO TRANSFORM CREDIT DEFAULT SWAPS INTO FINANCIAL GUARANTY POLICIES AND TO TRANSFORM FINANCIAL GUARANTY POLICIES INTO CREDIT DEFAULT SWAPS, filed as U.S. Provisional Appln. 60/215,195, in the names of J. Shildler, R. Denton, T. Jasper.

11. METHOD AND SYSTEM FOR USING CREDIT DEFAULT SWAPS IN THE STRUCTURING AND PRICING OF CREDIT-LINKED NOTES, filed as U.S. Provisional Appln. 60/215,194, in the names of J. Shildler, R. Denton, T. Jasper, J. Whittaker.

12. METHOD AND SYSTEM FOR USING CREDIT DEFAULT SWAPS IN THE STRUCTURING AND PRICING OF PRINCIPAL PROTECTION NOTES, filed as U.S. Provisional Appln. 60/215,193, in the names of J. Shildler, R. Denton, J. Whittaker, J. Bauman.

13. METHOD AND SYSTEM FOR USING CREDIT DEFAULT SWAPS IN THE STRUCTURING AND PRICING OF CONVERTIBLE BONDS, filed as U.S. Provisional Appln. 60/215,192, in the names of J. Shildler, T. Jasper, J. Whittaker.

14. METHOD AND SYSTEM FOR USING CREDIT DEFAULT SWAPS IN THE STRUCTURING AND PRICING OF EQUITY OPTIONS, filed as U.S. Provisional Appln. 60/215,191, in the names of J. Shildler, J. Whittaker, J. Bauman.

15. METHOD AND SYSTEM FOR USING CREDIT DEFAULT SWAPS IN THE STRUCTURING AND PRICING OF COLLATERALIZED DEBT OBLIGATIONS, filed as U.S. Provisional Appln. 60/215,190, in the names of J. Shildler, J. Whittaker.

16. METHOD AND SYSTEM FOR USING CREDIT DEFAULT SWAPS IN THE STRUCTURING AND PRICING OF INDUSTRY-SPECIFIC CREDIT INDEXES, filed as U.S. Provisional Appln. 60/215,189, in the names of J. Shildler, J. Whittaker.

17. METHOD AND SYSTEM FOR USING CREDIT DEFAULT SWAPS IN THE STRUCTURING AND PRICING OF CREDIT RATING-SPECIFIC CREDIT INDEXES, filed as U.S. Provisional Appln. 60/215,186, in the names of J. Shildler, J. Whittaker.

18. METHOD AND SYSTEM FOR USING CREDIT DEFAULT SWAPS IN THE STRUCTURING AND PRICING OF GEOGRAPHY-SPECIFIC CREDIT INDEXES, filed as U.S. Provisional Appln. 60/215,188, in the names of J. Shildler, J. Whittaker.

19. DYNAMIC INTEREST RATE SWAP CURVE USED IN THE PRICING OF CREDIT DEFAULT SWAPS AND OTHER CREDIT RISK TRANSFER PRODUCTS, filed as U.S. Provisional Appln. 60/215,187, in the names of J. Shildler, R. Denton, T. Jasper.

20. DYNAMIC ASSET SWAP TERM STRUCTURE TO CRESIT SWAP TERM STRUCTURE CONVERSION PROCESS USED IN THE PRICING OF CREDIT DEFAULT SWAP AND OTHER CREDIT RISK TRANSFER PRODUCTS, filed as U.S. Provisional Appln. 60/215,185, in the names of J. Shildler, R. Denton, T. Jasper, J. Whittaker.

21. METHOD AND SYSTEM USED FOR THE ONLINE CREATION AND DISRIBUTION OF CREDIT DEFAULT SEAPS AND OTHR CREDIT RISK TRANS-

FER PRODUCTS, filed as U.S. Provisional Appln. 60/215, 184, in the names of J. Shildler, R. Denton, J. Whittaker, A. Rainsby.

22. METHOD AND SYSTEM USED FOR ONLINE NEGOTIATION OF CONTRACTS DOCUMENTING CREDIT DEFAULT SWAPS AND OTHER CREDIT RISK TRANSFER PRODUCTS, filed as U.S. Provisional Appln. 60/215,204, in the names of J. Shildler, R. Denton, T. Jasper, J. Whittaker, A. Rainsby.

TECHNICAL FIELD

This invention generally relates to a system for creating, pricing and managing credit risk transfer products, and the trading and distribution of such products through electronic distribution networks, financial information systems, intranet systems, and the Internet.

BACKGROUND OF INVENTION

Today's financial markets are undergoing unprecedented structural changes as the result of three macro trends. A first macro trend is "sector convergence", which is the merging of investment banking, commercial banking, and insurance markets and products. The second macro trend is the growth of credit risk transfer instruments, which has created a current market of $1.5 trillion for credit risk transfer products. The third macro trend is the increasing use of electronic distribution networks, financial information systems, intranet systems, and the Internet for instantaneous online distribution and trading of financial instruments.

The present invention provides a new system to harness and benefit from these three structural changes transforming the financial markets.

SUMMARY OF INVENTION

In the present invention, a computerized system creates and prices synthetic credit products on demand and delivers them to customers using electronic distribution networks, financial information systems, intranet systems, and online trading websites. The credit products may cover a wide range of conventionally known financial instruments, such as credit swaps, letters of credit, and credit insurance, which allow customers to trade and transfer the risks of various types of credit obligations (bond, loan, or receivable), as well as new types of credit risk transfer and enhancement products enabled by the invention system. Credit product sellers use these credit risk transfer, insurance, or enhancement products to isolate, modify, or unbundle credit risks from other risks found in obligations owed to them by third parties. These risks are transferred to credit risk buyers for a price that is based on the level of risk assumed. Credit products, particularly credit swaps, can also be used to construct a new generation of innovative structured products, such as credit-linked notes, synthetic CDOs, and principal-protected notes.

Other objects, features, and advantages of the present invention will be explained in the following detailed description of the invention having reference to the appended drawings.

DETAILED DESCRIPTION OF INVENTION

Figure 1:
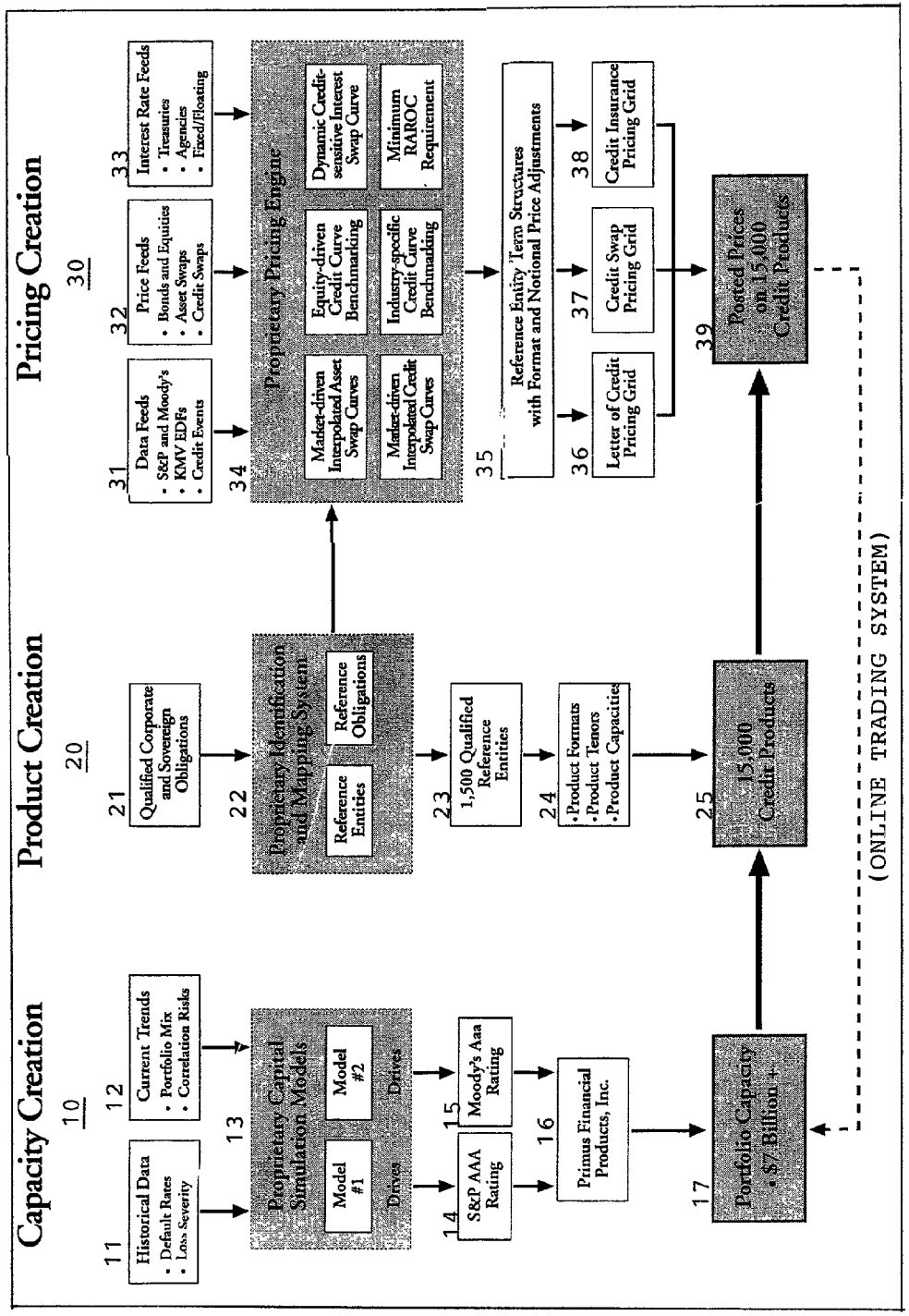
FIG. 1 is a schematic diagram of a system for creating and pricing synthetic credit products in accordance with the invention.

Referring to FIG. 1, an example of a system for creating and pricing synthetic credit products in accordance with the invention is shown having the following three basic components. A Capacity Creation module 10 assesses the capacity of credit products so that the overall system can create and maintain a minimum level of default risk using a dynamic mix of hard and soft capital. A Historical Data submodule 11 analyzes default rates and loss severity, and a Current Trends submodule 12 analyzes portfolio mix and correlation risks. Their outputs are fed to a proprietary Capital Simulation Models submodule 13, which employs one or more financial simulation models to determine corresponding risk ratings as used by established rating agencies, e.g., S&P AAA rating 14 or Moody's AAA rating 15. The rated capital capacities are fed to a financial intermediary 16 which manages the capacity of its portfolio 17 of credit products.

A Product Creation module 20 includes an Obligations submodule 21 that analyzes corporate and governmental (sovereign) obligations that are tracked in its database, and a proprietary Identification and Mapping system 22 creates an internal mapping of reference entities with reference obligations, resulting in a database 23 of qualified reference entities (e.g., 1500 entities) mapped to their credit obligations. A reference entity is the party that owes an obligation and is the source of the credit risk. A Product Creation engine 24 then creates credit products 25 (tradable financial instruments, e.g., 15,000 of them) matched to the qualified reference entities based upon internal templates for their formats, tenors, notational amounts and a percentage of capacity, as managed according to the determined portfolio capacity of the Capacity Creation module 10.

A Pricing Creation module 30 includes Data Feeds submodule 31, which tracks financial data available from external sources, such as S&P and Moody's, EDFs, and credit events, Price Feeds submodule 32, which tracks pricing data available from external sources, such as for publicly traded bonds and equities, asset swaps, and credit swaps, and Interest Rate Feeds submodule 33, which tracks interest rate data available from external sources, such as Treasury Bill rates, Agencies' rates, and LIBOR/Treasuries fixed/floating rates. The analyses of external data are fed to a proprietary Pricing Engine 34 which analyzes pricing using internal algorithms for a number of price/demand curves, such as market-driven interpolated asset swap curves, market-driven interpolated credit swap curves, equity-driven credit curve benchmarking, industry-specific credit curve benchmarking, dynamic credit-sensitive interest swap curves, and minimum RAROC requirements.

The Pricing Engine 34 sends its outputs to a database 35 of reference entity term structures with format and notational price adjustments, which are used for various product pricing grids, such as a Letter of Credit pricing Grid 36, Credit Swap Pricing Grid 37, and a Credit Insurance Pricing Grid 38. The pricing grids determine the prices posted in a database 39 of the credit products identified and created by the Product Creation module 20. The priced products are fed to an electronic distribution system, such as a financial information system, or an electronic trading system (as described below) which returns data for trading transactions and volumes that are used in determining the current portfolio capacity 17.

Figure 2:
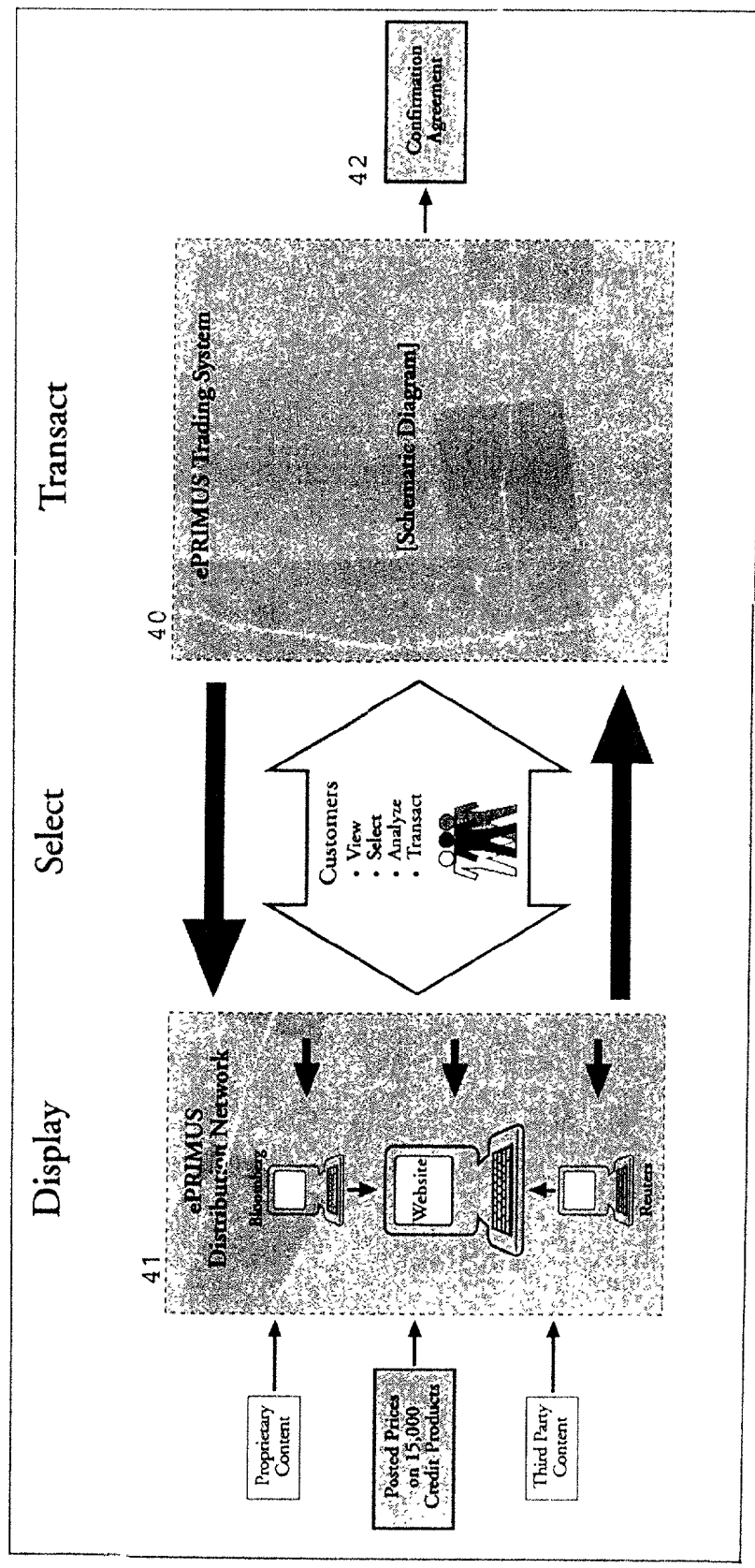
FIG. 2 is a schematic diagram of an online system for trading synthetic credit products as created and priced in the system of FIG. 1.

Referring to FIG. 2, an example of an electronic trading system is shown, referred to as "CLICK & HEDGE" technology, which is a trademark used by the assignee of the present application, ePrimus Capital Technologies, Inc., New York, N.Y. The credit products created and priced by the "manufacturing" system illustrated in FIG. 1 are offered in an online trading system 40, such as an Internet website that allows customers to connect and transact in the products via a TCP/IP network connection. The trading system offerings are also distributed on associated outlets of larger financial information systems 41. The associated outlets can include established financial information systems, such as those operated by Bloomberg or Reuters, or other independent trading systems accessible through their websites. These other financial information systems can also include their own proprietary content as well as third party content. The customers view, select, analyze, and transact in buying and selling the posted credit products. Completed transactions are managed by a transaction system 42 which formalizes and records the transactions in standard form confirmation agreements.

To assure confidence in use of the system, the contracts of credit product buyers may be guaranteed by the operator of the trading system against losses on a specific bond, loan, or receivable owed to them by a third party. The operator may be paid an annual, subscription, or per-transaction fee for providing this service. The historical defaults and losses for investment grade risks of qualified reference entities have been extremely low.

The present system has the advantage that no inventory of financial instruments needs to be maintained by the trading system operator. Credit products are manufactured on demand and delivered directly to the financial information systems and to the online trading site. The system can provide customers around the world with real-time pricing and immediate online execution of credit products. Individual transactions can be initiated, negotiated, and executed in seconds. Trade confirmations can be immediately posted to customers' home pages where it can be included in those customers' portfolio management systems, or to their email addresses. The product creation engine using tested modeling technology and formation templates allow customers to construct their own customized products in real time. The speed and efficiency of the system is expected to greatly reduce transaction and friction costs and open up whole new markets for credit products.

In the following description, specific examples, products features, and other advantages of the above-described system are illustrated.

1. Creation and Sale of Credit Risk Transfer Products Online

Credit risk transfer products are created and priced in real-time based on financial and credit information for issuers of debt obligations, with a means for displaying the information pertaining to the credit risk transfer products online, and a means for enabling customers to access such information about the products online, including negotiating the terms for each product offered and executing transactions based on the negotiated terms. Additionally, the system manages the risks associated with the business. Based on the underlying financial market information, the system may create a plurality of credit risk transfer products, including six products that make a payment only in the event that a predefined credit event occurs, and five products that make principal and interest payments over the life of the product.

2. Determining Creditworthiness or Claims Paying Ability of Seller of Credit Default Swaps Procedures for determining the prospective creditworthiness or the claims paying ability of a seller of credit default swaps are established using a credit risk capital model. Based on a specified portfolio of credit default swaps, the model calculates the expected loss ratio for all swaps as a function of entity capital. The expected loss ratio for each swap is compared to a creditworthiness loss benchmark, to determine capital adequacy for the entity. The minimum amount of required credit risk capital is such that the expected loss ratio for each swap is no greater than a creditworthiness loss benchmark. The capital model uses a cash flow simulation that incorporates the potential future cash flows affecting the capital adequacy of the entity through portfolio maturity. These include credit losses from multiple reference asset defaults, surety bond premiums (where such bonds constitute a portion of the capital), interest income from a portfolio of investments, corporate taxes, and operating expenses. A Monte Carlo simulation captures low probability tail events, the risk of temporal cash flow mismatches, and the effects of the portfolio's non-homogenous reference asset mix. The results can then be used to determine the credit ratings that a nationally recognized statistical rating organization ("NRSRO") will assign to the seller of these credit risk transfer products.

3. Determining Creditworthiness or Claims Paying Ability of Seller of Credit Default Swaps Procedures for determining the prospective creditworthiness or claims paying ability of a seller of credit default swaps are established using a credit risk capital model. Based on a specified portfolio of credit default swaps, the model is designed to determine the amount of capital required for an entity to maintain a level of creditworthiness. The model calculates the probability of entity bankruptcy resulting from credit default swap losses exceeding available resources, as a function of credit risk capital. The minimum amount of required credit risk capital is determined by finding the capital amount that results in a probability of bankruptcy equal to that probability associated with some desired or specified creditworthiness level. The model uses a cash flow simulation that incorporates all potential future cash flows affecting the capital adequacy of the entity through portfolio maturity. These include credit losses from multiple reference asset defaults, soft capital premiums (where such capital constitutes a portion of the overall credit risk capital), swap premiums, interest income from a portfolio of investments, and operating expenses. A Monte Carlo simulation captures low probability tail events, the risk of temporal cash flow mismatches, and the effects of the portfolio's non-homogenous reference asset mix. The results can then be used to determine the credit ratings that a nationally recognized statistical rating organization ("NRSRO") will assign to the seller of these credit risk transfer products.

4. Determining Creditworthiness or Claims Paying Ability of Seller of Credit Default Swaps Procedures for determining the prospective creditworthiness or claims paying ability of a seller of credit default swaps are established using a credit risk capital model. Based on a portfolio of credit default swaps, the model is designed to determine the amount of credit risk capital required for an entity to maintain a level of creditworthiness.

The model incorporates future cash flows affecting capital adequacy of an entity through portfolio maturity. These cash flows include default losses, soft capital premiums (where such capital constitutes a portion of the overall credit risk capital), swap premiums, interest income from a portfolio of investments, and operating expenses. The minimum amount of required capital risk capital is determined so that the entity is able to cover all its losses using available income and capital, through portfolio maturity. The results can then be used to determine the credit ratings that a nationally recognized statistical rating organization ("NRSRO") will assign to the seller of these credit risk transfer products.

5. Determining Expected Loss on Capital of Entity that Sells Credit Default Swaps Procedures for determining the expected loss on a senior tranche of the capital of an entity that sells credit default swaps are established using a credit risk capital model. Based on a portfolio of credit default swaps, the model is designed to determine the probability of potential losses to a soft capital provider, as a result of default losses on the portfolio, in excess of soft capital premium earnings and "first loss" equity capital. The model uses a Monte Carlo simulation that incorporates the potential future cash flows affecting the capital adequacy of the entity through portfolio maturity. These include credit losses from multiple reference asset defaults, soft capital premiums (where such capital constitutes a portion of the overall credit risk capital), swap premiums, interest income, corporate taxes, and operating expenses.

6. Method that Collects, Filters, Matches, and Displays Credit Risk Transfer Product Information A computer-based system and method collects, filters, matches, and displays credit risk transfer product information, and uses the product configuration information to generate product prices based on financial and credit information. The methodology is used to create a knowledge map that contains product information objects. A product information object can be one of: a product object, representing variable information relating to transaction parameters; a pricing object, representing financial and credit information used to price credit risk transfer products; a grouping object, grouping product and pricing objects; or a relational object representing a relation between product and pricing objects. An input device is used to select a plurality of product information objects, configure the objects, and position the objects in a display area. Information pertaining to objects and their configuration is stored in a database. Changes can be made directly to the information stored in the database, and these changes are reflected in a corresponding display of the product information.

7. Capacity Calculation and Availability Updating Process

The system provides a capacity calculation and availability updating process utilizing a rule-based expert system to provide a portfolio of credit default swaps to be delivered to a pricing engine. The system utilizes an artificial intelligence engine driving dynamic feedback between a transaction processing engine and the capacity calculation engine to define a grouping of credit default swaps based on portfolio constraints and financial and credit information.

8. Providing Credit Enhancement to Commercial Bank Letters of Credit Issued by Second Entity A first entity, referred to as the Credit Risk Provider, engages in the business of providing credit enhancement to commercial bank letters of credit issued by a second entity, hereafter referred to as the Primary Provider, through the issuance of a credit default swap between the Credit Risk Provider and the Primary Provider. The credit default swap provides for payment by the Credit Risk Provider to the credit beneficiary should the Primary Provider fail to honor its obligation under its letter of credit.

9. Providing Credit Enhancement to Financial Guaranty Insurance Policies

A first entity, referred to as the Credit Risk Provider, engages in the business of providing credit enhancement to financial guaranty insurance policies by way of an arrangement with a second entity, hereafter referred to as the Primary Provider, through the issuance of a credit default swap provides for payment by the Credit Risk Provider to the credit beneficiary should the Primary Provider fail to honor its obligation under its letter of credit.

10. Product Transformation from Credit Default Swap into Financial Guaranty Insurance Procedures are established for structuring credit risk products that enable the transformation from credit default swap into financial guaranty insurance and vice versa. The method comprises providing a format for purchasers of the product to subsequently chose, at their option, to unilaterally transform a credit default swap into a financial guaranty insurance policy and to transform the same financial guaranty policy into a credit default swap. In either format, the purchaser will receive the same contracted payment should the credit default swap or financial guaranty policy experience any of a set of predefined and contracted credit events. The system is particularly suited to enable purchasers of credit risk transfer products to efficiently manage their accounting of such products.

11. Providing Credit Risk Transfer Products to Create Credit-linked Notes

A first entity, referred to as the Credit Risk Provider, engages in the business of providing credit risk transfer products to create credit-linked notes by way of a joint venture or other arrangement with a second entity, referred to as the Structurer. These two entities create a third entity special purpose vehicle that will hold a portfolio of assets and issue securities whose principal and interest will be secured by cash flows of the underlying assets and credit default swaps.

12. Providing Credit Risk Transfer Products to Create Principal Protected Notes

A first entity, referred to as the Credit Risk Provider, engages in the business of providing credit risk transfer products to create principal protected notes by way of a joint venture or other arrangement with a second entity, hereafter referred to as the Structurer. These two entities create a third entity special purpose vehicle that will hold a portfolio of assets and issue securities whose principal and interest will be secured by cash flows of the underlying assets and credit default swaps.

13. Providing Credit Risk Transfer Products to Create Convertible Bonds

A first entity, referred to as the Credit Risk Provider engages in the business of providing credit risk transfer products to create convertible bonds by way of a joint venture or other arrangement with a second entity, hereafter referred to as the Structurer. These two entities create a third entity special purpose vehicle that will hold a portfolio of assets and issue securities whose principal and interest will be secured by cash flows of the underlying assets and credit default swaps.

14. Providing Credit Risk Transfer Products to Create Equity Options

A first entity, referred to as the Credit Risk Provider, engages in the business of providing credit risk transfer products to create equity options by way of a joint venture or other arrangement with a second entity, hereafter referred to as the Structurer. These two entities create a third entity special purpose vehicle that will hold a portfolio of assets and issue securities whose principal and interest will be secured by cash flows of the underlying assets and credit default swaps.

15. Providing Credit Risk Transfer Products to Create Collateralized Debt Obligations A first entity, referred to as the Credit Risk Provider, engages in the business of providing credit risk transfer products to create collateralized debt obligations by way of a joint venture or other arrangement with a second entity, hereafter referred to as the Structurer. These two entities create a third entity special purpose vehicle that will hold a portfolio of assets and issue securities whose principal and interest will be secured by cash flows of the underlying assets and credit default swaps.

16. Providing Credit Risk Transfer Products to Create Industry-specific Credit Indexes A first entity, referred to as the Credit Risk Provider, engages in the business of providing credit risk transfer products to create industry-specific credit indexes by way of a joint venture or other arrangement with a second entity, hereafter referred to as the Structurer, these two entities create a third entity special purpose vehicle that will hold a portfolio of assets and issue securities whose principal and interest will be secured by cash flows of the underlying assets and credit default swaps.

17. Providing Credit Risk Transfer Products to Create Credit Rating-specific Credit Indexes A first entity, referred to as the Credit Risk Provider, engages in the business of providing credit risk transfer products to create credit rating-specific credit indexes by way of a joint venture or other arrangement with a second entity, hereafter referred to as the Structurer, these two entities create a third entity special purpose vehicle that will hold a portfolio of assets and issue securities whose principal and interest will be secured by cash flows of the underlying assets and credit default swaps.

18. Providing Credit Risk Transfer Products to Create Geography-specific Credit Indexes A first entity, referred to as the Credit Risk Provider, engages in the business of providing credit risk transfer products to create geography-specific credit indexes by way of a joint venture or other arrangement with a second entity, hereafter referred to as the Structurer. These two entities create a third entity special purpose vehicle that will hold a portfolio of assets and issue securities whose principal and interest will be secured by cash flows of the underlying assets and credit default swaps.

19. Creating and Managing Dynamic Interest Rate Swap Curve

The system creates and manages a dynamic interest rate swap curve, including means for analyzing and processing predetermined financial information using inter-bank rates as well as sovereign, government agency, and corporate dollar denominated debt yields; means for analyzing and processing such information into a dynamic interest rate swap curve; and means for evaluating the information to determine the applicable interest rate to use in pricing credit risk transfer products in respect of issuers of corporate, government agency, and sovereign debt obligations, depending upon the issuers' creditworthiness. This method is applied in a plurality of systems, including a price computing environment and an online, real-time mark-to-market valuation service.

20. Creating and Managing Dynamic Asset Swap Curve

The system creates and manages a dynamic asset swap curve and converting the curve into a dynamic credit swap curve for any particular issuer of debt obligations through a pricing adjustment matrix. The system includes means for analyzing and processing generic asset swap curves based on sovereign, government agency, and corporate dollar denominated debt yields and the dynamic interest rate swap curve; means for converting such curves into credit swap curves by creating and processing market-driven interpolated asset swap curves, dynamic credit-sensitive asset swap curves, equity-driven interpolated asset swap curves, liquidity-adjusted asset swap curves, and risk-capital adjusted asset swap curves; and means for evaluating the information to use in pricing credit risk transfer products in respect of issuers of corporate, government agency, and sovereign debt obligations. The method is applied in a plurality of systems, including a price computing environment and an online, real-time mark-to-market valuation service.

21. Storing, Processing, and Reporting Pricing Information

This is an enterprise-wide integrated computer system for storing, processing, and reporting pricing information regarding a plurality of credit risk transfer products, including a pricing function for pricing and re-pricing products in response to market price changes. Pricing and re-pricing are accomplished on a product-by-product basis. The method is applied in a computer system, accessible by a customer's computer over the Internet for ordering credit risk transfer products, and includes a product information unit, a purchase transaction information entry and verification unit; a transaction information storage unit, a transaction code generator, a purchase order generator, a transaction code interpreter and payment processor, and a product purchase control unit. The product information is accessed by the customer's computer to enable the customer to view the product information. A variety of security functions provide different levels of access to the services for different customers.

22. Automatically Preparing Client Worksheet

This provides for automatically preparing a client worksheet, which communicates the terms and conditions of a credit risk transfer product to a client, wherein such client communication is for combined use with a corresponding host vehicle. The method comprises providing a format for client communication which includes inputting variable information into a computer-accessible storage medium; inputting decision information into the storage medium; using the decision information to generate a product price based on the variable information entered by the client; and communicating such price and other variable information to the client, including a means to iterate the process for online negotiation of the price and other variable information. The apparatus comprises an inputting device for inputting variable information into a computer-accessible storage medium; a processor operatively coupled to such storage medium that combines client-input variable information with the decision information to generate a product price; and an output preparing component that is in operative communication with the processor that publishes client communications, such that price and other variable information are automatically updated within such client communication. This system efficiently automates the negotiation and settlement process in respect of credit risk transfer products transactions.

It is to be understood that many modifications and variations may be devised given the above description of the principles of the invention. It is intended that all such modifications and variations be considered as within the spirit and scope of this invention, as defined in the following claims.

We claim:

1. A computerized system for creating synthetic credit products comprising:
   (a) at least one processor;
   (b) at least one database coupled to the processor;
   (c) a Capacity Creation module, coupled to the at least one processor and the at least one database, for determining the capacity of a defined financial market that includes at least one entity to absorb defined synthetic credit products at a minimum level of default risk, wherein the synthetic credit products include credit default swaps for structuring and pricing of credit-rating specific credit indexes; and
   (d) a Product Creation module, coupled to the at least one processor and the at least one database, for creating the synthetic credit products including a Product Creation engine for creating the synthetic credit products matched to debt obligations of qualified reference entities based upon internal templates in accordance with the capacity determined by the Capacity Creation module.

2. A system according to claim 1, further comprising an online trading system for receiving the created and priced products from the Product Creation module and a Pricing Creation module and offering said products for transactions to customers connected to the online trading system.

3. A system according to claim 1, wherein said Pricing Creation module uses internal algorithms for a number of priced/demand curves, including market-driven interpolated asset swap curves, market-driven interpolated credit swap curves, equity-driven credit curve benchmarking, industry-specific credit curve benchmarking, dynamic credit-sensitive interest swap curves, and minimum RAROC requirements.

4. A system according to claim 1, for the creation, distribution, execution and management and control of credit risk transfer products over the Internet and over various intranet systems.

5. A system according to claim 1, for determining the creditworthiness and capital adequacy of entities that sell credit risk transfer products based on simulation of the expected loss of individual credit risk transfer products.

6. A system according to claim 1, for determining the creditworthiness and capital adequacy of entities that sell credit risk transfer products based on simulation of the expected loss of a portfolio of credit risk transfer products.

7. A system according to claim 1, for determining the creditworthiness and capital adequacy of entities that sell credit risk transfer products based on a static expected loss cash flow model for a portfolio of credit risk transfer products.

8. A system according to claim 1, for determining the expected loss on a senior tranche of the capital of an entity that sells credit risk transfer products based on a dynamic cash flow simulation model for a portfolio of credit risk transfer products.

9. A system according to claim 1, for using reference entity filtering logic and database matching logic to create a portfolio of investment grade credit risk transfer products.

10. A system according to claim 1, for calculating capacity and updating availability by reference entity following transactions through feedback application of a portfolio constraints adjustment.

11. A system according to claim 1, for using credit default swaps to credit enhance commercial bank letters of credit.

12. A system according to claim 1, for using credit default swaps to credit enhance financial guaranty insurance policies.

13. A system according to claim 1, used to transform credit default swaps into financial guaranty policies and to transform financial guaranty policies into credit default swaps.

14. A system according to claim 1, for using credit default swaps in the structuring and pricing of credit-linked notes.

15. A system according to claim 1, for using credit default swaps in the structuring and pricing of principal protected notes.

16. A system according to claim 1, for using credit default swaps in the structuring and pricing of convertible bonds.

17. A system according to claim 1, for using credit default swaps in the structuring and pricing of equity options.

18. A system according to claim 1, for using credit default swaps in the structuring and pricing of collaterialized debt obligations.

19. A system according to claim 1, for using credit default swaps in the structuring and pricing of industry-specific credit indexes.

20. A system according to claim 1, for using credit default swaps in the structuring and pricing of geography-specific credit indexes.

21. A system according to claim 1, employing a dynamic interest rate swap curve used in the pricing of credit default swaps and other credit risk transfer products.

22. A system according to claim 1, employing a dynamic asset swap term structure to credit swap term structure conversion process used in the pricing of credit default swaps and other credit risk transfer products.

23. A system according to claim 1, used for the online creation and distribution of credit default swaps and other credit risk transfer products.

24. A system according to claim 1, used for the online negotiation of contracts documenting credit default swaps and other credit risk transfer products.

25. A method for creating synthetic credit products performed on a computerized system comprising:
   (a) determining the capacity of a defined financial market that includes at least one entity to absorb defined synthetic credit products at a minimum level of default risk, wherein the synthetic credit products include credit default swaps for structuring and pricing of credit-rating specific credit indexes; and;
   (b) creating the synthetic credit products, including creating the synthetic credit products matched to debt obligations of qualified reference entities based upon internal templates in accordance with the capacity determined in step(a);
   wherein steps (a) and (b) are performed using at least one processor coupled to at least one database.

* * * * *